(No Model.) 2 Sheets—Sheet 1.

A. McINTOSH.
HAY PRESS.

No. 567,406. Patented Sept. 8, 1896.

Witnesses

Inventor
A. McIntosh
by his Attorneys
Baldwin, Davidson
+ Wight (No Model.) 2 Sheets—Sheet 2.

A. McINTOSH.
HAY PRESS.

No. 567,406. Patented Sept. 8, 1896.

Witnesses

Inventor
A. McIntosh.
by his Attorneys
Baldwin Davidson
Wight.

UNITED STATES PATENT OFFICE.

ALEXANDER McINTOSH, OF BUDA, TEXAS.

HAY-PRESS.

SPECIFICATION forming part of Letters Patent No. 567,406, dated September 8, 1896.

Application filed July 26, 1895. Serial No. 557,226. (No model.)

*To all whom it may concern:*

Be it known that I, ALEXANDER MCINTOSH, a citizen of the United States, residing at Buda, in the county of Hays and State of Texas, have invented certain new and useful Improvements in Hay-Presses, of which the following is a specification.

My invention relates to that class of hay-presses in which the plunger or traverser rebounds by the elasticity of the baled hay or by the force exerted by a spring at the end of its forward movement. Some of my improvements, however, may be used in machines for baling hay of other classes.

According to my invention the plunger or traverser is arranged in a suitable frame and is drawn toward its rearward position by means of a spring. Rods are connected to the opposite sides of the plunger or traverser, and these are in turn connected to a cross-head, which in turn is connected with a pitman provided on its outer end with a hook that engages mechanism to give to it a motion which imparts a reciprocating motion to the plunger.

The mechanism for operating the pitman is of an improved construction, so constructed, organized, and arranged that it will draw the plunger forward, imparting great power to the pressure at the last part of the stroke and automatically releasing the pitman from the operating mechanism at the end of the stroke and permitting the plunger to rebound.

Improved devices are employed for adjusting and regulating the movements of the apparatus to meet the several conditions of the use to which the apparatus is subjected.

Figure 1:
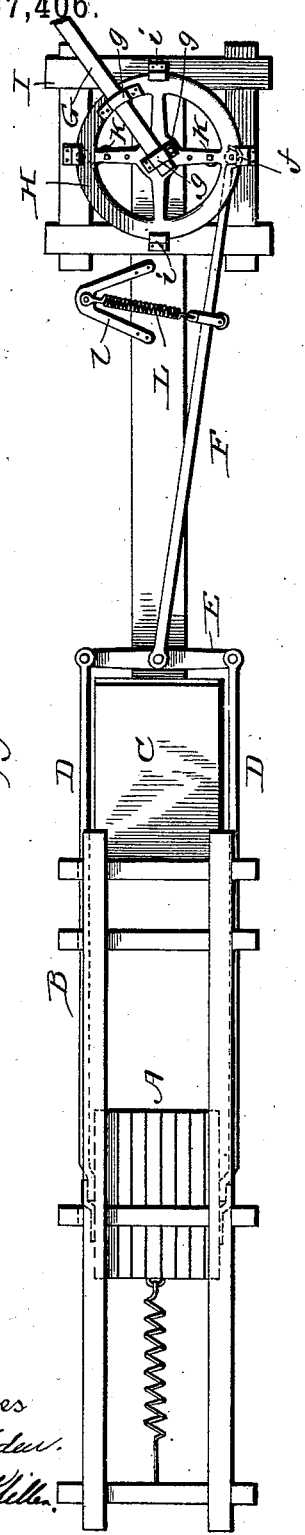
Figure 2:
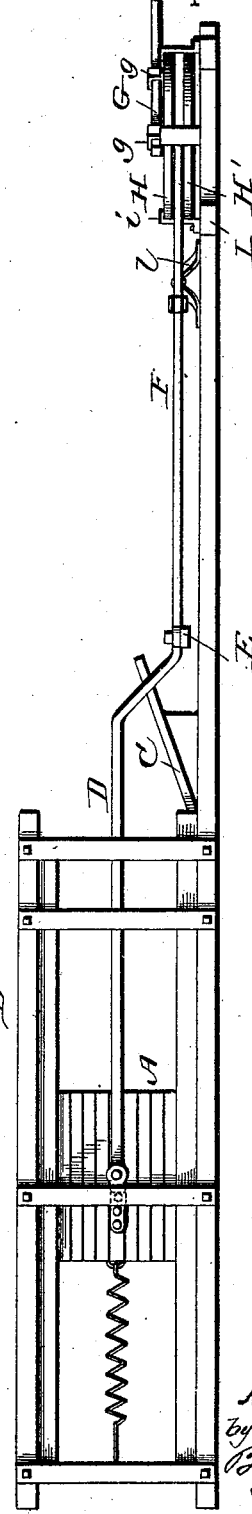
Figure 3:
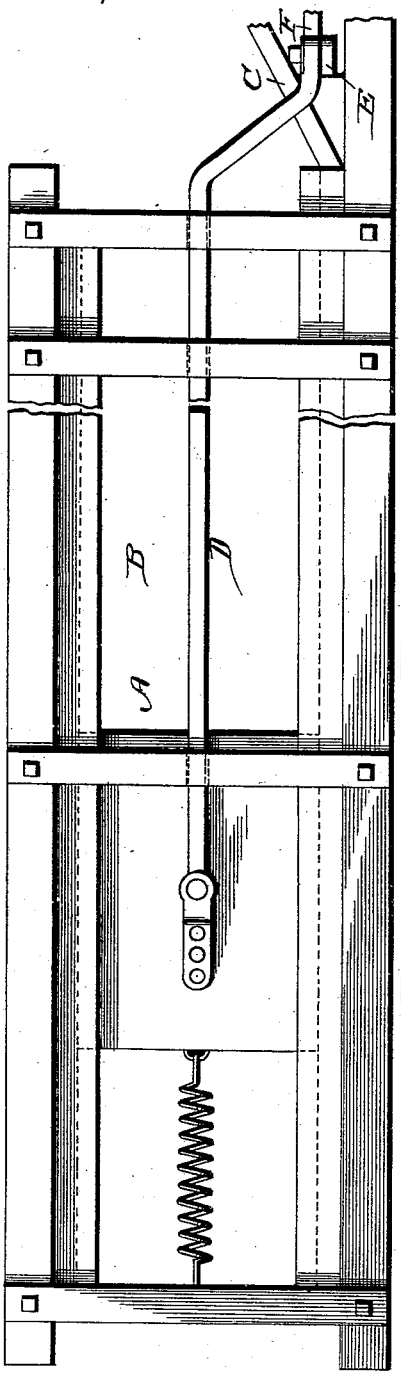
Figures 4, 5, 6:
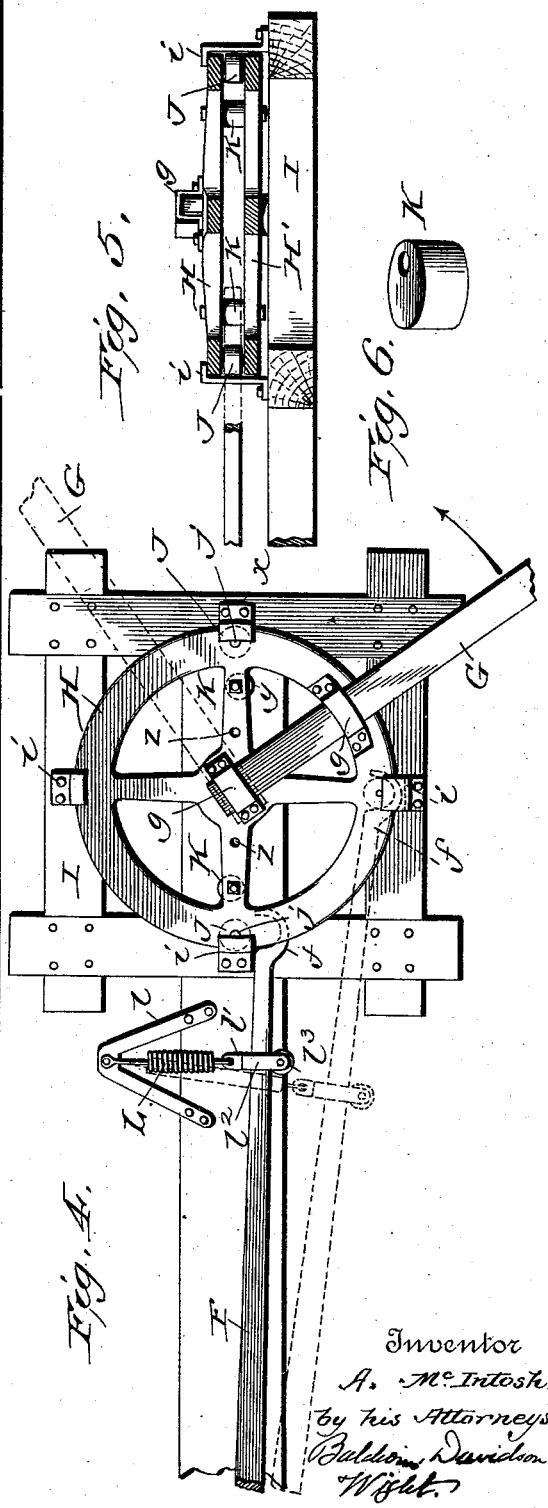

In the accompanying drawings, Figure 1 is a plan view of a baling-press embodying my improvements. Fig. 2 is a side elevation thereof. Fig. 3 is a view on an enlarged scale, in side elevation and partly broken away, of the baling chamber and plunger. Fig. 4 is a detail view, on an enlarged scale and in plan, of the mechanism for imparting a reciprocating motion to the plunger. Fig. 5 is a detail view in section of the operating mechanism shown in Fig. 4. Fig. 6 is a detail view of one of the eccentrics used in the operating mechanism.

The plunger or traverser A is of any suitable construction and is mounted in a baling-chamber B, which may also be of usual well-known construction, being provided at its front end with an inclined board C, over which the bale passes after it has been compressed. Rods D are attached to the opposite sides of the plunger and at their rear ends, and at their front ends are pivotally connected with a cross-head E, to which in turn is pivotally connected a pitman-rod F, that is provided at its opposite end with a hook $f$.

The draft bar or sweep G is connected by fastening devices $g$ with the wheel H, which has a duplicate H' beneath it. These wheels are arranged on a frame I, and are guided by brackets $i$. Rollers J are interposed between the wheel H and H', and are mounted on pins $j$. Two such rollers are shown. The wheels are held apart a suitable distance to permit the rotation of the rollers and to accommodate the eccentrics K, which may correspond in number with the rollers. Two of these eccentrics are shown in Fig. 4. They are arranged between the axes of the wheels and the adjacent rollers J, which are close to the periphery.

The hook $f$ is adapted to engage alternately with the rollers J. The pitman F is drawn toward a line passing through the axes of the wheels and baling-chamber by means of a spring L, attached to a bracket $l$ on the main frame. The spring is pivotally connected at $l'$ with a block $l^2$, carrying a pulley $l^3$. The end of the pitman passes through an opening in the block and the pulley bears on the edge of the pitman. The arrangement is such, as is indicated in Fig. 4, that the pitman is free to reciprocate back and forth and also to move laterally, at all times being under spring-tension, while the spring is not drawn to an undue extent out of its normal position. In operation, when the plunger or traverser is in its backward position, the hook $f$ is in position to engage one of the rollers J, as shown in Fig. 4. The sweep is revolved in the direction indicated by the arrow. The roller will engage the hook $f$ and draw it to the position indicated by dotted lines in Fig. 4, drawing the plunger with it. Afterward the hook will be drawn forward and will finally come in contact with the bracket $i$, as indicated at $x$. The hook will also come in contact with the eccentric at $y$, and as the sweep rotates the hook will be disengaged from the roller and the pitman, with the plunger, will rebound and come into position shown by full lines in Fig. 4, to engage with another roller. By repeated similar operations the hay is pressed into bales. Two charges are made for each revolution of the sweep. The eccentrics K may be adjusted to unhook the pitman from the roller at varying points. Additional perforations are shown in the wheels at $z$ for adjusting the eccentrics and the rollers. By placing the eccentrics at the holes $z$ and the rollers J at the points $y$ the time of releasing the hook may be very much varied and a finer adjustment may be attained by adjusting the eccentric.

I claim as my invention—

1. The combination of the pitman having a hooked end, the sweep, the wheel connected therewith, a series of rollers carried by the wheel with which the hooked end of the pitman is adapted to engage, the adjustable eccentric carried by the wheel adapted to engage with the hook on one side of its opening, and a stationary bracket adapted to engage with the hook on the opposite side of its opening.

2. The combination of the plunger, the pitman connected therewith, the sweep, the roller-carrying wheel connected with the sweep, and the adjustable eccentric also carried by the wheel and adapted to engage with the pitman to disengage it from the roller.

3. The combination of the pitman having a hooked end, the sweep, the wheel with which the sweep is connected, the rollers carried thereby and which are removable and adjustable, as described, and the eccentric also removable and adjustable on the wheel, as and for the purpose specified.

In testimony whereof I have hereunto subscribed my name.

ALEXANDER McINTOSH.

Witnesses:
  W. M. WALTON,
  GEO. S. WALTON.